United States Patent
Doron (10) Patent No.: US 10,110,813 B1
(45) Date of Patent: Oct. 23, 2018

(54) MULTI-SENSOR CAMERA USING ROLLING SHUTTER SENSORS

(71) Applicant: Ambarella, Inc., Santa Clara, CA (US)

(72) Inventor: Moshe Doron, San Francisco, CA (US)

(73) Assignee: Ambarella, Inc., Santa Clara, CA (US)

( * ) Notice: Subject to any disclaimer, the term of this patent is extended or adjusted under 35 U.S.C. 154(b) by 168 days.

(21) Appl. No.: 15/139,845

(22) Filed: Apr. 27, 2016

(51) Int. Cl.
| | |
|---|---|
| *H04N 7/18* | (2006.01) |
| *H04N 5/232* | (2006.01) |
| *H04N 5/247* | (2006.01) |
| *H04N 5/77* | (2006.01) |

(52) U.S. Cl.
CPC ......... *H04N 5/23238* (2013.01); *H04N 5/247* (2013.01); *H04N 5/77* (2013.01)

(58) Field of Classification Search
CPC .................................................. H04N 5/23238
USPC ........................................................ 348/38
See application file for complete search history.

(56) References Cited

U.S. PATENT DOCUMENTS

| | | | | |
|---|---|---|---|---|
| 9,204,041 B1 * | 12/2015 | Campbell | .......... | H04N 13/0239 |
| 9,363,569 B1 * | 6/2016 | van Hoff | ............ | G06Q 30/0263 |
| 2003/0007088 A1 * | 1/2003 | Rantanen | ............. | H04N 5/2354 |
| | | | | 348/371 |
| 2006/0157760 A1 * | 7/2006 | Hayashi | ................... | G03B 7/00 |
| | | | | 257/293 |
| 2008/0170848 A1 * | 7/2008 | Wernersson | ............. | G06T 5/50 |
| | | | | 396/335 |
| 2009/0201361 A1 * | 8/2009 | Lyon | .................. | H04N 5/23203 |
| | | | | 348/36 |
| 2010/0045847 A1 * | 2/2010 | Ryu | ...................... | H04N 5/2253 |
| | | | | 348/341 |
| 2010/0309333 A1 * | 12/2010 | Smith | .................... | H04N 5/235 |
| | | | | 348/230.1 |
| 2012/0002099 A1 * | 1/2012 | Tajiri | .................... | H04N 5/3532 |
| | | | | 348/362 |
| 2012/0044381 A1 * | 2/2012 | Jannard | .................. | H04N 5/235 |
| | | | | 348/229.1 |
| 2013/0076624 A1 * | 3/2013 | Sato | ...................... | G06F 3/0428 |
| | | | | 345/157 |
| 2014/0063229 A1 * | 3/2014 | Olsson | ................. | H04N 5/2252 |
| | | | | 348/84 |

* cited by examiner

*Primary Examiner* — Leron Beck
(74) *Attorney, Agent, or Firm* — Christopher P. Maiorana, PC (57) ABSTRACT

An apparatus comprising one or more first image sensors, one or more second image sensors and a processor. The processor may be configured to (a) initiate an exposure of the first image sensors, (b) delay an exposure of the second image sensors until a portion of the first image sensors is started and (c) perform video stitching operations on video frames captured by the first image sensors and the second image sensors to generate a stitched video signal.

19 Claims, 9 Drawing Sheets

MULTI-SENSOR CAMERA USING ROLLING SHUTTER SENSORS

FIELD OF THE INVENTION

The invention relates to video capture generally and, more particularly, to a method and/or apparatus for implementing a multi-sensor camera using rolling shutter sensors.

BACKGROUND

Imaging sensors that implement a rolling shutter are typically much smaller and less expensive than imaging sensors that implement a global shutter. Size and cost can be limited because rolling shutter sensors do not implement a storage circuit per photodiode in a pixels array. One limitation of a rolling shutter sensor is that upper lines of the rolling shutter sensor are exposed earlier than lower lines of the rolling shutter sensor. Exposing the upper lines earlier than the lower lines of the rolling shutter sensor introduces a distortion of a captured image when there is motion (i.e., a point of reference may move in between the time the upper lines are exposed and the later time when the lower lines are exposed).

Distortion caused due to rolling shutter sensors creates issues when implemented as part of a multi-sensor camera. The distortion causes a mismatch when images from multiple sensors are stitched together. The images of two sensors are not properly aligned when stitched together because pixels from one of the rolling shutter sensors may be exposed earlier than pixels from another of the rolling shutter sensors. The distortion causes motion artifacts.

It would be desirable to implement a multi-sensor camera using rolling shutter sensors.

SUMMARY

The invention concerns an apparatus comprising one or more first image sensors, one or more second image sensors and a processor. The processor may be configured to (a) initiate an exposure of the first image sensors, (b) delay an exposure of the second image sensors until a portion of the first image sensors is started and (c) perform video stitching operations on video frames captured by the first image sensors and the second image sensors to generate a stitched video signal.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a multi-sensor camera using rolling shutter sensors that may (i) delay an exposure of one or more rolling shutter sensors, (ii) compensate for misalignment of captured images due to a rolling shutter effect, (iii) be performed at a sensor-level, (iv) delay exposure of a next sensor until a particular line of sensors are reached, (v) initiate exposure of a lower sensor when an upper sensor starts exposing lines that overlap with the upper lines of the lower sensor, (vi) perform video stitching operations, (vii) be implemented using two or more rows of capture devices and/or (viii) be implemented as one or more integrated circuits.

Figure 1:
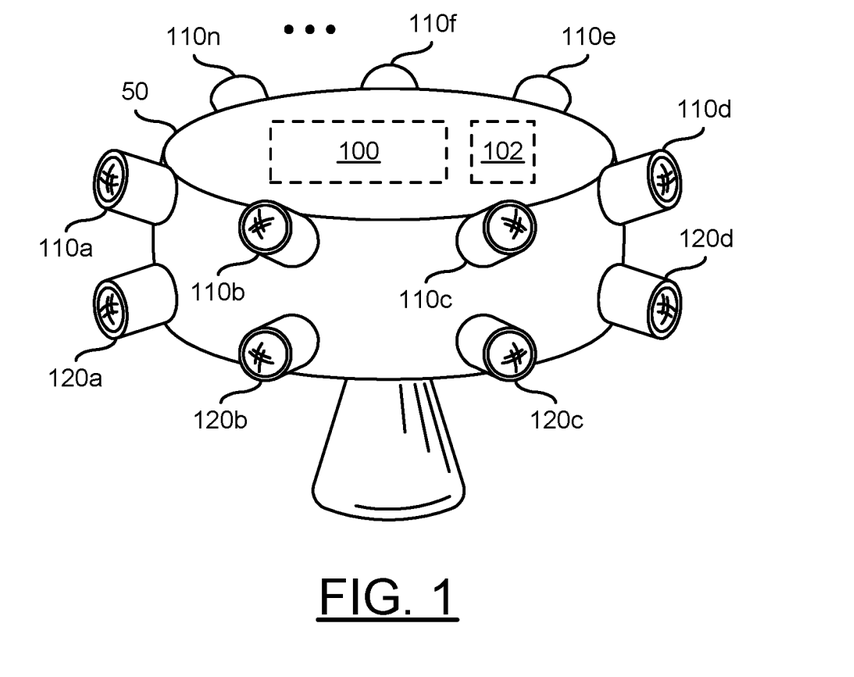
FIG. 1 is a diagram of an example embodiment of a multi-sensor camera.

Referring to FIG. 1, a diagram of an example embodiment of a multi-sensor camera 50 is shown. The camera 50 generally comprises a block (or circuit) 100, a block (or circuit) 102, a plurality of camera lenses 110a-110n and a plurality of camera lenses 120a-120n. The block 100 may be implemented as a processor, such as a video processor system on a chip (SoC) or other video processor. The block 102 may be implemented as memory configured to store data, such as image data. The lenses 110a-110n may be configured in a first row. The lenses 120a-120n may be configured in a second row. The lenses 110a-110n and/or the lenses 120a-120n may be configured to focus light onto an image sensor (to be described in more detail in connection with FIG. 3). In some embodiments, the multi-sensor camera may further comprise additional rows of lenses. The number of rows of lenses may be varied according to the design criteria of a particular implementation.

Images captured using the first row of lenses 110a-110n, the second row of lenses 120a-120n and/or any additional rows of lenses may be stitched together to generate a spherical video frame. In some embodiments, the video processor 100 may be configured to generate video frames based on the images captured using the first row of lenses 110a-110n, the second row of lenses 120a-120n and/or any additional rows of lenses. In some embodiments, the video processor 100 may be configured to perform video stitching operations to generate spherical video frames for a spherical video (e.g., a 360 degree video, near 360 degree video, a virtual reality video, etc.).

The multi-sensor camera 50 may be configured to capture images using the first row of lenses 110a-110n, the second row of lenses 120a-120n and/or any additional rows of lenses. For example, the first row of lenses 110a-110n may capture a first row of images (e.g., a top row) and the second row of lenses 120a-120n may capture a second row of images (e.g., a bottom row). The video processor 100 may be configured to generate video frames using the captured images.

The video frames may be stitched together (e.g., by the processor 100). In an example, the video processor 100 may perform video stitching operations to stitch the video frames captured by the first row of lenses 110a-110n together horizontally (e.g., a left side of a video frame may be stitched to a right side of a video frame). In another example, the video processor 100 may perform video stitching operations to stitch the video frames captured by the second row of lenses 120a-120n together horizontally. In still another example, the video processor 100 may perform video stitching operations to stitch the video frames captured by the first row of lenses 110a-110n to the video frames captured by the second row of lenses 120a-120n together vertically (e.g., a bottom of the video frames captured by the lenses 110a-110n may be stitched to a top of the video frames captured by the lenses 120a-120n). Similarly, the video processor 100 may perform video stitching operations to stitch the video frames captured by the second row of lenses 120a-120n to video frames captured by additional rows of lenses vertically.

Figure 2:
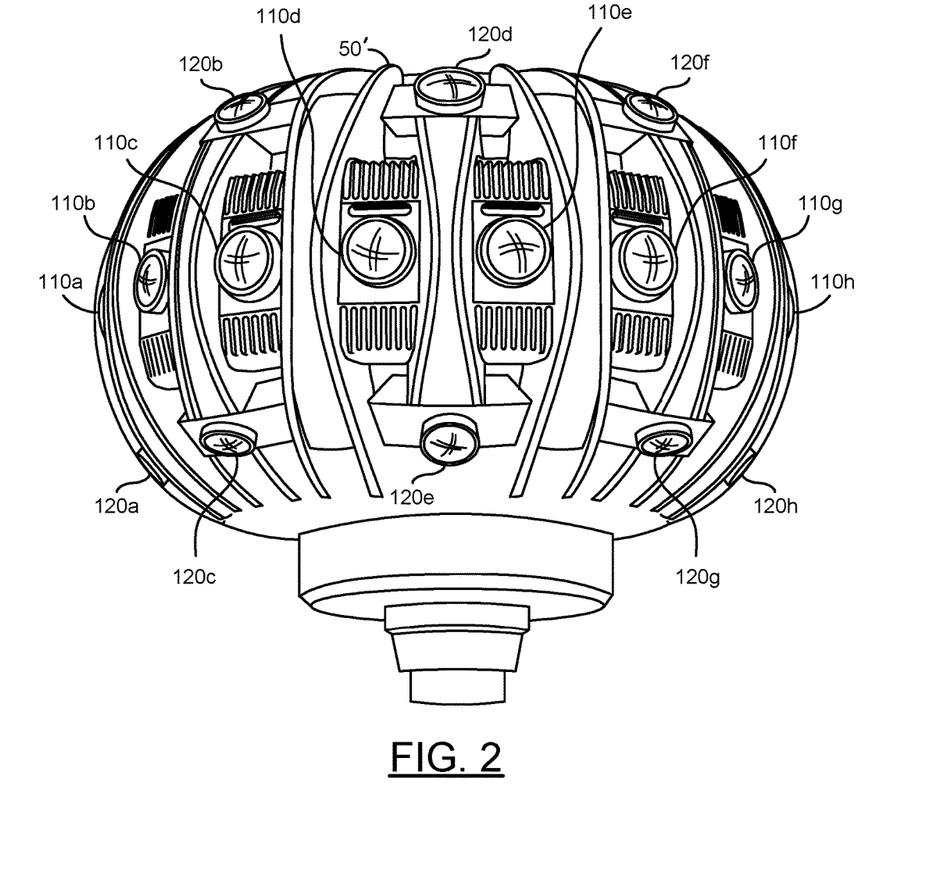
FIG. 2 is a diagram of an alternate example of a multi-sensor camera.

Referring to FIG. 2, a diagram of an alternate example of a multi-sensor camera 50' is shown. The camera 50' shows the lenses 110a-110n arranged in a row generally located around a center portion of the camera 50'. The lenses 120a-120n are shown in an alternating (or staggered) configuration around the camera 50'. For example, the lens 120a, 120c, 120e and 120g are shown near a bottom portion of the camera 50'. The lenses 120b, 120d, and 120f are shown near a top portion of the camera 50'.

The camera 50' implementing the staggered arrangement of the lenses 110a-110n and the lenses 120a-120n may be configured to capture images in an overlapping arrangement. For example, the video processor 100 may generate video frames from the images captured by the lenses 110a-110n and/or 120a-120n. An area of an environment surrounding the camera 50' may be captured by each of the lenses 110a-110n and/or 120a-120n. Some of the lenses 110a-110n and/or 120a-120n may capture portions of the same area (e.g., overlapping regions). In some embodiments, the video processor 100 may be configured to perform the video stitching operations on the video frames captured by the lenses 110a-110n and/or the lenses 120a-120n to generate a spherical field of view. The spherical field of view may comprise the areas of the environment surrounding the camera 50'. The video processor 100 may be configured to generate the spherical field of view using the overlapping regions.

Figure 3:
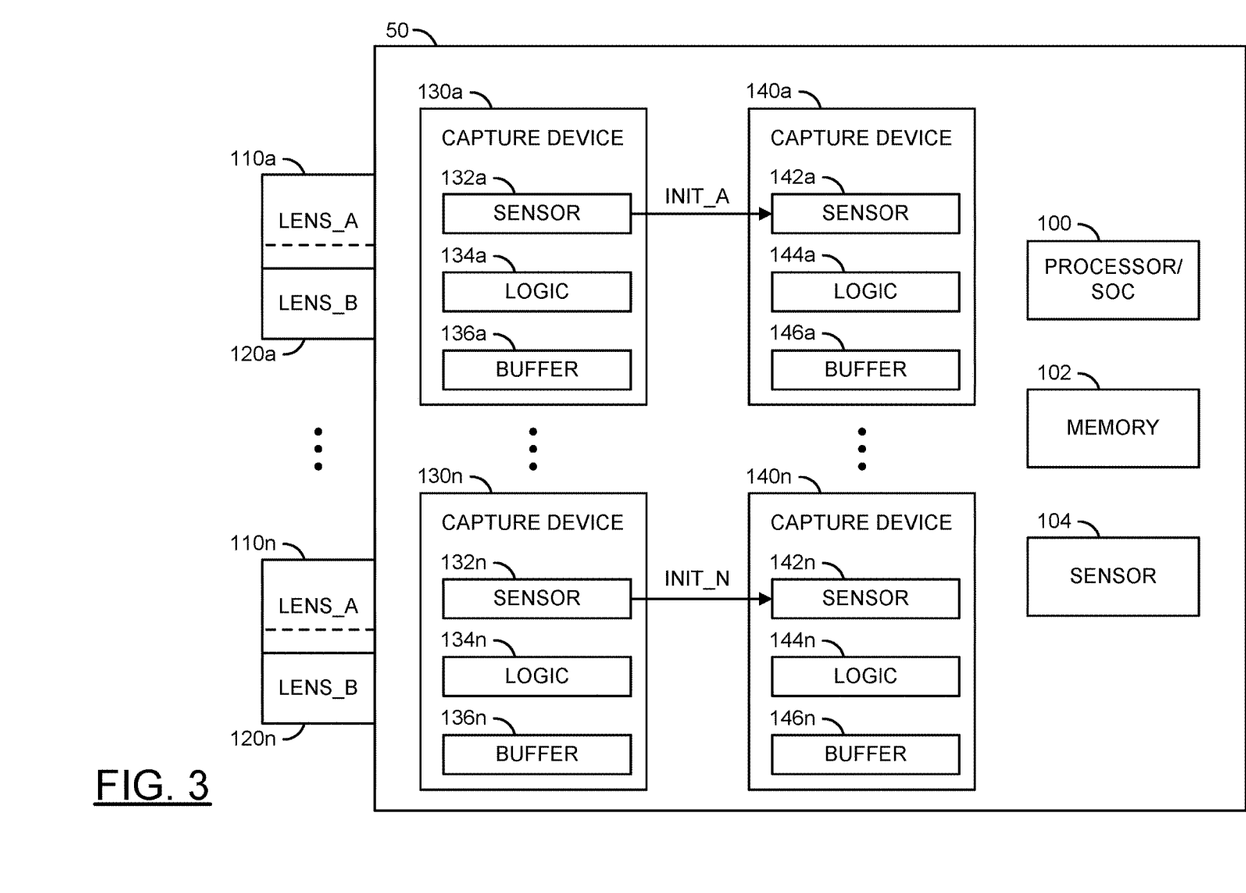
FIG. 3 is a block diagram of an example embodiment of the present invention.

Referring to FIG. 3, a block diagram of the multi-sensor camera is shown in accordance with an embodiment of the invention. The camera 50 may comprise the processor 100, the memory 102, a block (or circuit) 104, the lenses 110a-110n, the lenses 120a-120n, blocks (or circuits) 130a-130n and/or blocks (or circuits) 140a-140n. The circuit 104 may be a sensor. The circuits 130a-130n may be capture devices. The circuits 140a-140n may be capture devices. In an example, the capture devices 130a-130n may be capture devices corresponding to the lenses 110a-110n. In another example, the capture devices 140a-140n may be capture devices corresponding to the lenses 120a-120n. In some embodiments, additional capture devices corresponding to any additional rows of lenses may be implemented. The camera 50 may comprise other components (not shown). The number, type and/or arrangement of the components of the camera 50 may be varied according to the design criteria of a particular implementation.

The processor 100 may be configured to generate video frames based on data from the capture devices 130a-130n and/or the capture devices 140a-140n. The processor 100 may be configured to generate a spherical video (e.g., a series of the spherical video frames) based on the video frames captured by the capture devices 130a-130n and/or the capture devices 140a-140n (and any additional capture devices). In an example, the processor 100 may be configured to perform the video stitching operations. The processor 100 may be configured to perform encoding operations (e.g., encode raw video data received from the capture devices 130a-130n and/or the capture devices 140a-140n). In some embodiments, the processor 100 may be configured to transcode video frames received from the capture devices 130a-130n and/or the capture devices 140a-140n. The operations performed by the processor 100 may be varied according to the design criteria of a particular implementation.

The processor 100 may be configured to execute computer readable code and/or process information. The processor 100 may be configured to receive input from and/or present output to the memory 102. The processor 100 may be configured to present and/or receive various signals (not shown). For example, the processor 100 may receive video signals from each of the capture devices 130a-130n and/or 140a-140n. The number and/or types of inputs and/or outputs of the processor 100 may be varied according to the design criteria of a particular implementation.

The memory 102 may store data. The memory 102 may be implemented as a cache, flash memory, DRAM memory, etc. The type and/or size of the memory 102 may be varied according to the design criteria of a particular implementation. The memory 102 may store the computer readable instructions for the processor 100.

The sensor 104 may be a motion sensor. The motion sensor 104 may be configured to generate motion data. The motion data generated by the motion sensor 104 may be used by the processor 100 to determine an amount and/or type of movement of the camera 50. For example, the motion sensor 104 may be implemented to determine a direction the camera 50 is moving, an amount the camera 50 has moved, a rotation of the camera 50 and/or a speed of movement of the camera 50. In some embodiments, the processor 100 may use the movement data generated by the motion sensor 104 to perform motion compensation for the spherical video. In an example, the sensor 104 may be implemented as a gyroscope. In another example, the sensor 104 may be implemented as a magnetometer. The type of sensor 104, and/or the data generated by the sensor 104 may be varied according to the design criteria of a particular implementation.

The lenses 110a-110n and/or the lenses 120a-120n are shown attached to the camera 50. In some embodiments, additional rows of lenses may be implemented. The lenses 110a-110n are shown located above the lenses 120a-120n. In some embodiments, the lenses 120a-120n may be located above the lenses 110a-110n. The lenses 110a-110n and/or the lenses 120a-120n may be configured to capture (or focus) light for a corresponding one of the capture devices 130a-130n and/or the capture devices 140a-140n. In an example, the lenses 110a-110n and/or the lenses 120a-120n may each implement a wide angle lens (e.g., a lens configured to view an area of 75 degrees or greater).

The capture devices 130a-130n may correspond to the first row of lenses 110a-110n. The capture devices 140a-140n may correspond to the second row of lenses 120a-120n. Generally, the capture devices 130a-130n and/or the capture devices 140a-140n may have similar implementations. The capture devices 130a-130n and/or the capture devices 140a-140n may be configured to generate video frames (or raw video data) for the processor 100.

Each of the capture devices 130a-130n may comprise a corresponding one of blocks (or circuits) 132a-132n, blocks (or circuits) 134a-134n and/or a blocks (or circuits) 136a-136n. Each of the capture devices 140a-140n may comprise a corresponding one of blocks (or circuits) 142a-142n, blocks (or circuits) 144a-144n and/or blocks (or circuits) 146a-146n. The circuits 132a-132n and/or the circuits 142a-142n may be camera sensors. The circuits 134a-134n and/or the circuits 144a-144n may be logic. The circuits 136a-136n and/or the circuits 146a-146n may be buffers.

The capture devices 130a-130n and/or 140a-140n may each be configured to capture video image data (e.g., from a corresponding one of the lenses 110a-110n and/or 120a-120n). The capture devices 130a-130n and/or 140a-140n may capture images received through the lenses 110a-110n and/or 120a-120n to generate a bitstream (e.g., generate video frames). For example, the capture devices 130a-130n and/or 140a-140n may receive light from the lens 110a-110n and/or 120a-120n.

The capture device 130a-130n and/or 140a-140n may transform the received light into digital data (e.g., a bitstream). In some embodiments, the capture devices 130a-130n and/or 140a-140n may perform an analog to digital conversion. For example, the capture devices 130a-130n and/or 140a-140n may perform a photoelectric conversion of the light received by the lenses 110a-110n and/or 120a-120n. The capture devices 130a-130n and/or 140a-140n may transform the bitstream into video data, a video file and/or video frames (e.g., perform encoding). For example, the video data may be a digital video signal. The digital video signal may comprise video frames (e.g., sequential digital images).

The video frames of the generated by the capture devices 130a-130n and/or 140a-140n of the environment surrounding the camera 50 may be represented as a signal/bitstream/data (e.g., a digital video signal). The capture devices 130a-130n and/or 140a-140n may each present video frames to the processor 100. In an example, the video frames may be a video stream from each of the capture devices 130a-130n and/or the capture devices 140a-140n.

The camera sensors 132a-132n and/or 142a-142n may each receive light from the corresponding lenses 110a-110n and/or 120a-120n. The camera sensors 132a-132n and/or 142a-142n may each transform the light into digital data (e.g., the bitstream). For example, the camera sensors 132a-132n and/or 142a-142n may perform the photoelectric conversion of the light received from the lenses 110a-110a and/or 120a-120n. The logic 134a-134n and/or 144a-144n may be configured to retrieve the light data from the corresponding camera sensors 132a-132n and/or 142a-142n to generate the bitstream in a human-legible content (e.g., video data). For example, the logic 134a-134n may receive pure (e.g., raw) data from the cameras sensor 132a-132n and/or 142a-142n and generate (e.g., encode) video data based on the raw data (e.g., the bitstream). The capture devices 130a-130n and/or 140a-140n may each have a memory (e.g., the buffers 136a-136n and/or 146a-146n) to store the raw data and/or the processed bitstream. For example, the buffers 136a-136n and/or 146a-146n (e.g., the frame memory) may store (e.g., provide temporary storage and/or cache) one or more of the video frames (e.g., the digital video signal).

The camera sensors 132a-132n and/or 142a-142n may implement rolling shutter sensors. The rolling shutter camera sensors 132a-132n and/or 142a-142n may capture images (e.g., light data) by performing an exposure from a top of the rolling shutter sensors 132a-132n and/or 142a-142n to the bottom of the rolling shutter sensors 132a-132n and/or 142a-142n. For example, the rolling shutter sensors 132a-132n and/or 142a-142n may comprise rows (e.g., lines) of a pixel array. The upper lines may be exposed first and the lower lines may be exposed last. The pixels corresponding to the upper lines of the rolling shutter sensors 132a-132n and/or 142a-142n may be exposed earlier than the pixels corresponding to the lower lines of the rolling shutter sensors 132a-132n and/or 142a-142n. For example, pixels corresponding to the top line of the rolling shutter sensors 132a-132n and/or 142a-142n may be exposed first and each subsequent line may be exposed in order.

In some embodiments, the rolling shutter sensors 132a-132n and/or 142a-142n may be configured to capture images by performing an exposure from the bottom of the rolling shutter sensors 132a-132n and/or 142a-142n to the top of the rolling shutter sensors 132a-132n and/or 142a-142n. For example, the rolling shutter sensors 132a-132n and/or 142a-142n may be CMOS sensors that may flip vertically. The lower lines may be exposed first and the upper lines may be exposed last. The pixels corresponding to the lower lines of the rolling shutter sensors 132a-132n and/or 142a-142n may be exposed earlier than the pixels corresponding to the upper lines of the rolling shutter sensors 132a-132n and/or 142a-142n. For example, pixels corresponding to the bottom line of the rolling shutter sensors 132a-132n and/or 142a-142n may be exposed first and each subsequent line in an upward direction may be exposed in order. Generally, the exposure of the rolling shutter sensors 132a-132n and/or 142a-142n may start at one side and progress across to the opposite side. The direction of exposure of the rolling shutter sensors 132a-132n and/or 142a-142n may be varied according to the design criteria of a particular implementation.

In some embodiments, the processor 100 may be configured to control an exposure time of the camera sensors 132a-132n, 142a-142n and/or any other rolling shutter sensors implemented by the multi-sensor camera 50. The processor 100 may be configured to delay an exposure of the camera sensors 142a-142n (e.g., for the second row of lenses 120a-120n) until a portion of the camera sensors 132a-132n (e.g., for the first row of lenses 110a-110n) has started. In an example, the processor 100 may initiate an exposure of the camera sensors 132a-132n. The processor 100 may delay an exposure of the camera sensors 142a-142n. When the exposure of the camera sensors 132a-132n has reached a pre-determined portion (e.g., a last line, an overlapping area between the camera sensors 132a-132n and the camera sensors 142a-142n, a portion before the last line, a lower portion, etc.) the processor 100 may be configured to initiate an exposure of the camera sensors 142a-142n. In embodiments, of the multi-sensor camera 50 having additional rows of rolling shutter sensors, when the exposure of the sensors 142a-142n has reached the pre-determined portion, the processor 100 may be configured to initiate an exposure of one or more of the additional rolling shutter sensors.

A signal (e.g., INIT_A) may be generated by the rolling shutter sensor 132a and transmitted to the rolling shutter sensor 142a. A signal (e.g., INIT_B) may be generated by the rolling shutter sensor 132n and transmitted to the rolling shutter sensor 142n. Similarly, each of the rolling shutter sensors 132a-132n may transfer the respective signals INIT_A-INIT_N to a respective one the rolling shutter sensors 142a-142n. In an example, the rolling shutter sensor 132a may be the upper sensor and the rolling shutter sensor 142a may be the sensor located directly below the rolling shutter sensor 132a. In another example, where the rolling shutter sensors 132a-132n and/or 142a-142n are exposed from bottom to top, the signals INIT_A-INIT_N may be generated by the sensors 142a-142n and transmitted to the sensors 132a-132n.

In some embodiments, the signals INIT_A-INIT-B may be implemented as a notification signal generated by the rolling shutter sensors 132a-132n in the first row of lenses 110a-110n used to initiate an exposure of the rolling shutter sensors 142a-142n in the second row of lenses 120a-120n. For example, the rolling shutter sensors 132a-132n may initiate an exposure to capture images and the exposure of the rolling shutter sensors 142a-142n may be delayed. When a particular portion of the rolling shutter sensors 132a-132n is reached (e.g., corresponding to a pre-determined amount of delay), the rolling shutter sensors 132a-132n may present the signals INIT_A-INIT_N to the rolling shutter sensors 142a-142n. The rolling shutter sensors 142a-142n may initiate an exposure in response to receiving the signal INIT_A-INIT_N. Similarly, in embodiments having more than two rows of rolling shutter sensors, the rolling shutter sensors 142a-142n may be configured to generate notification signals for the next row of rolling shutter sensors.

Each of the sensors 132a-132n and/or 142a-142n may be configured to capture a field of view. Since the rolling shutter sensors 132a-132n and/or 142a-142n may be exposed from top to bottom (or bottom to top), the portion used by the processor 100 to initiate an exposure of the next row of the rolling shutter sensors may be based on a vertical field of view of the sensors 132a-132n and/or 142a-142n. For example, a particular horizontal line that is exposed by the rolling shutter sensors 132a-132n and/or 142a-142n may correspond to the vertical field of view covered by the rolling shutter sensors 132a-132n and/or 142a-142n. In some embodiments, the vertical fields of view of the rolling shutter sensors 132a-132n and/or 142a-142n may overlap (e.g., the coverage of the rolling shutter sensors covers an overlapping region of the spherical field of view).

Figure 4:
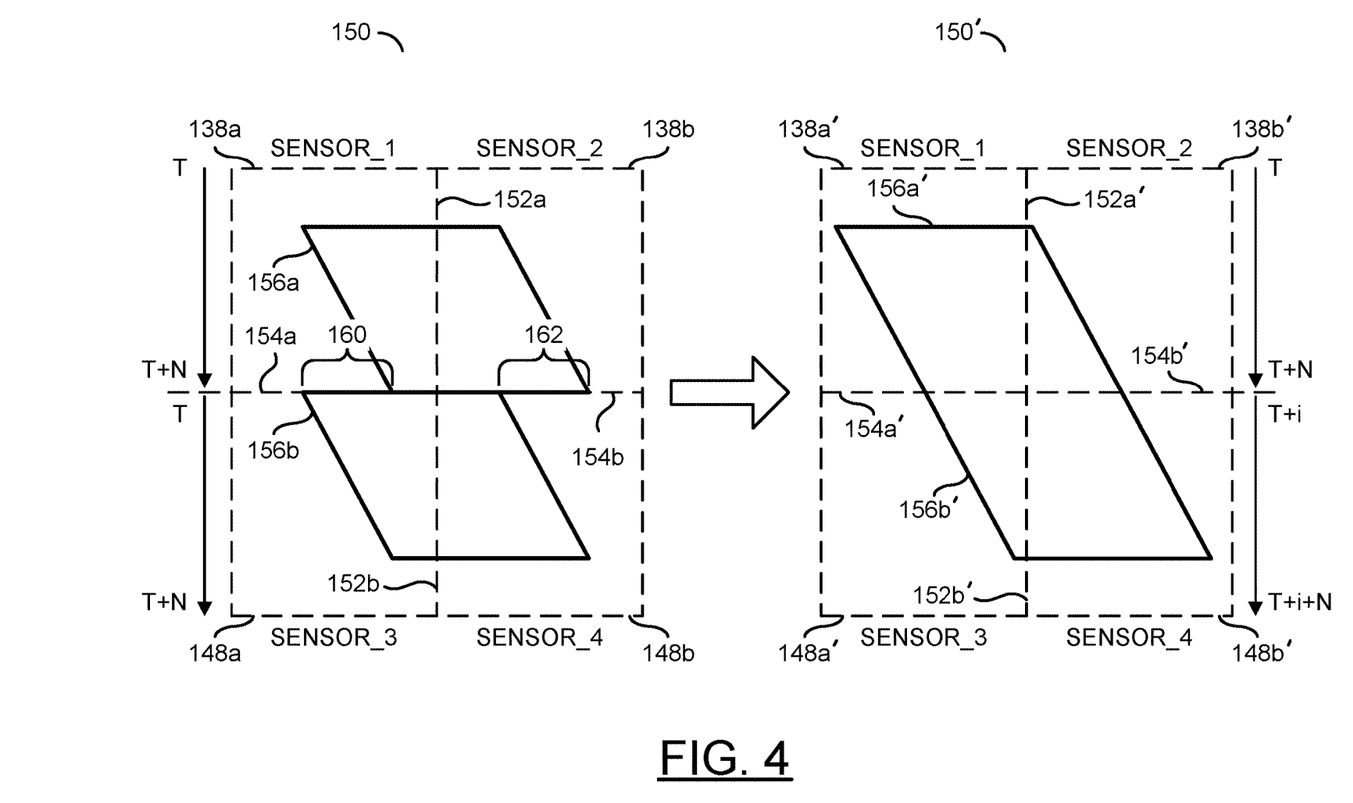
FIG. 4 is a diagram illustrating a video stitching operation using rolling shutter camera sensors.

Referring to FIG. 4, a diagram of a frame 150 illustrating video stitching operation using a number of the rolling shutter camera sensors 132a-132n and/or 142a-142n is shown. The frame 150 may represent a portion of the spherical video frame captured by the camera 50. The frame 150 is shown without compensation for distortions introduced by the rolling shutters camera sensors 132a-132n and/or 142a-142n.

The frame 150 is shown generated from an image 138a, an image 138b, an image 148a, and an image 148b. The image 138a may be generated from the rolling shutter sensor 132a (e.g., SENSOR_1). The image 138b may be generated from the sensor 132b (e.g., SENSOR_2). The image 148a may be generated from the sensor 142a (e.g., SENSOR_3). The image 148b may be generated from the sensor 142b (e.g., SENSOR_4). An object 156a is shown captured partially in the image 138a and partially in the image 138b. Similarly, an object 156b is shown partially captured in the image 148a and partially in the image 148b.

The object 156a and the object 156b may represent a single object captured by the camera 50 in the environment surrounding the camera 50. The single object 156a and 156b may be an object captured while moving (e.g., either the object 156a-156b may be moving or the camera 50 may be moving when the object 156a-156b has been captured). The object 156a and the object 156b are shown having a skew 160 and/or a skew 162. The skew 160 and/or 162 may be a mismatch resulting from the video stitching operations performed by the processor 100. For example, the skew 160 and/or 162 may appear as a discontinuity of the object 156a and 156b (e.g., together the single object captured by the camera 50). The skew 160 and/or 162 may be a result of the distortion of the captured images caused by the rolling shutter sensors 132a-132n from the first row of lenses 110a-110n being stitched to the captured images of the rolling shutter sensors 142a-142n from the second row of lenses 120a-120n.

A stitch boundary (or border) 152a is shown between the SENSOR_1 and the SENSOR_2. The stitch boundary 152a may be representative of stitch boundaries between each of the video frames captured by the first row of lenses 110a-110n (e.g., horizontal stitching). A stitch boundary (or border) 152b is shown between the SENSOR_3 and the SENSOR_4. The stitch boundary 152b may be representative of stitch boundaries between each of the video frames captured by the second row of lenses 120a-120n (e.g., horizontal stitching). A stitch boundary (or border) 154a is shown between the SENSOR_1 and the SENSOR_3. A stitch boundary 154b is shown between the SENSOR_2 and the SENSOR_4. The stitch boundaries 154a and/or 154b may be representative of stitching boundaries between each of the video frames captured by the first row of lenses 110a-110n and the second row of lenses 120a-120n (e.g., vertical stitching). For example, the stitch boundaries 154a-154b may represent a video stitching operation performed by the processor 100 of video data captured by a bottom of the rolling shutter sensors 132a-132n to video data captured by a top the rolling shutter sensors 142a-142n.

The frame 150 may represent an example of video stitching performed by the processor 100 without the delay implemented by the processor 100 and/or the camera sensors 132a-132n and/or 142a-142n. The SENSOR_1, the SENSOR_2, the SENSOR_3 and the SENSOR_4 are shown generally capturing the respective images 138a-138b and 148a-148b at the same (or similar) time (e.g., the exposure of each of the rolling shutter sensors 132a-132n and/or 142a-142n is initiated at approximately the same time). A time line T through T+N is shown on the left side of the image 138a and/or the image 148a. If the SENSOR_1 and SENSOR_3 are each using rolling shutters, then the object 156a and/or the object 156b are shown having the skew 160. A similar skew 162 is shown between the object 156a and/or the object 156b in the SENSOR_2 and the SENSOR_4.

For the example frame 150, all of the rolling shutter sensors 132a-132n and/or 142a-142n may start capture/exposure simultaneously. The horizontal stitching boundaries 152a-152b may be okay to stitch when the sensors 132a-132n and/or 142a-142n are exposed simultaneously because the images 138a-138b are exposed at the same time and the images 148a-148b are exposed at the same time (e.g., no mismatch of the object 156a between the images 138a-138b and no mismatch of the object 156b between the images 148a-148b). The vertical stitching boundaries 154a-154b may not be okay to stitch when the sensors 132a-132n and/or 142a-142n are exposed simultaneously (e.g., mismatch between the object 156a-156b).

In the example shown, since the object 156a-156b is moving, the mismatch caused by the rolling shutter sensors 132a-132n and/or 142a-142n may be visible (e.g., the skew 160 and/or 162). Since the pixels at the top of SENSOR_1 and SENSOR_2 are exposed at time T, the object 156a has moved by the time T+N has been reached when the pixels at the bottom of SENSOR_1 and SENSOR_2 are exposed. Since the pixels at the top of SENSOR_3 and SENSOR_4 are also exposed at the time T, the top of the object 156b aligns with the top of the object 156a instead of the bottom of the object 156b that has been exposed at the time T+N. The mismatch caused by the rolling shutter sensor effect may appear as a discontinuity between the object 156a and the object 156b.

In some embodiments, an amount of the skew 160 and/or the skew 162 may be analyzed by the processor 100. For example, the processor 100 may be configured to analyze the images 138a-138n and/or 148a-148n of the spherical video frame to calculate the amount of the skew 160 and/or 162. The amount of the skew 160 and/or 162 may be used by the processor 100 to determine an amount of delay (e.g., i) to implement for initiating the exposure of the second row of sensors 142a-142n.

The frame 150' may represent an example of video stitching performed by the processor 100 with the delay i implemented by the processor 100 and/or the camera sensors 132a-132n and/or 142a-142n. The frame 150' is shown with the object 156a' and the object 156b' stitched together without the skew 160 and/or 162. A time line T through T+N is shown at the right side of the image 132b'. A time line T+i through T+i+N is shown at the right side of the image 142b'. The value i may represent an amount of delay implemented by the processor 100 (or the camera sensors 132a-132n and/or 142a-142n). The delay i may be used to reduce and/or eliminate the mismatch between the images 138a'-138b' and the images 148a'-148b'.

In general, the SENSOR_1 and/or the SENSOR_2 capture the object 156a' during the time line T through T+N. After the time i, the time line T+i begins the capture of the object 156b' by the SENSOR_3 and/or the SENSOR_4. By delaying the capture of the object 156b', the overall object captured by the SENSOR_1, the SENSOR_2, the SENSOR_3 and/or the SENSOR_4 avoids the skew 160 and/or 162. In general, the SENSOR_3 and/or the SENSOR_4 have a delayed exposure compared with the SENSOR_1 and/or the SENSOR_2. The frame 150' may be one of a number of frames used to generate a stitched video signal. While four sensors are shown, the particular number of sensors implemented may be varied to meet the design criteria of a particular implementation.

In the example shown, since the object 156a'-156b' is moving, the processor 100 may implement the delay i to prevent the mismatch caused by the rolling shutter sensors 132a-132n and/or 142a-142n (e.g., the skew 160 and/or 162 from the frame 150). Since the pixels at the top of SENSOR_1 and SENSOR_2 are exposed at time T, the object 156a' has moved by the time T+N is reached when the pixels at the bottom of SENSOR_1 and SENSOR_2 are exposed. Since the pixels at the top of SENSOR_3 and SENSOR_4 are delayed by the delay time i the top of the object 156b' aligns with the bottom of the object 156a'. With the delay time implemented in the frame 150', the object 156a' and the object 156b' may appear as the single object (e.g., there is minimal discontinuity between the top portion of the object 156a' and the bottom portion of the object 156b').

The processor 100 may be configured to determine (e.g., calculate and/or calibrate) an amount of time of the delay i. In some embodiments, the delay i may be determined based on a specification of the rolling shutter sensors 132a-132n and/or 142a-142n. For example, the memory 102 may store a previously known value (e.g., determined by a manufacturer of the rolling shutter sensors 132a-132n and/or 142a-142n and/or determined by a manufacturer of the camera 50) for the delay i based on the specifications of the rolling shutter sensors 132a-132n and/or 142a-142n. In some embodiments, the delay i may be calibrated by a user of the camera 50. In an example, the user may record a video, playback the video to determine an amount of mismatch in the recorded video and update a parameter for the delay i. In some embodiments, the processor 100 may track information about a progress of the exposure of the rolling shutter sensors 132a-132n and/or 142a-142n. For example, the rolling shutter sensors 132a-132n and/or 142a-142n may provide the processor 100 information related to a particular line that is currently being exposed. Based on the current line being exposed and the amount of the delay i, the processor 100 may initiate the exposure of the next row of rolling shutter sensors 142a-142n.

In some embodiments, the processor 100 may be configured to perform an automatic calibration of the delay i. The processor 100 may be configured to perform video analytics of images and objects (e.g., the object 156a-156b) to determine an amount of mismatch between images captured using the rolling shutter sensors 132a-132n and the images captured using the rolling shutter sensors 142a-142n. In an example, the processor 100 may perform an analysis of the object 156a-156b in the example frame. For example, the object 156a-156b may be a test object (or test pattern) having a known size and/or shape. The processor 100 may be configured to determine an amount of the skew (or mismatch) 160 and 162. Based on the amount of the skew 160 and/or 162, the processor 100 may calculate the delay i. In some embodiments, the processor 100 may perform an iterative calibration of the delay i (e.g., determine the skew 160 and/or 162 of the object 156a-156b, calculate the delay i, capture the object 156a-156b, check the amount of skew 160 and/or 162 and make further adjustments to the delay i). The method of calibration of the delay i performed by the processor 100 may be varied according to the design criteria of a particular implementation.

In some embodiments, the processor 100 may be configured to provide data corresponding to the amount of the delay i to each of the rolling shutter sensors 132a-132n and/or 142a-142n. Each of the rolling shutter sensors 132a-132n and/or 142a-142n may adjust a timing of the signals INIT_A-INIT_N based on the data received from the processor 100. For example, the sensors 132a-132n and/or 142a-142n may continue using the timing for the signals INIT_A-INIT_B until an update is received from the processor 100. In some embodiments, the timing of the signals INIT_A-INIT_N may be pre-configured based on the specification of the sensors 132a-132n and/or 142a-142n.

Figure 5:
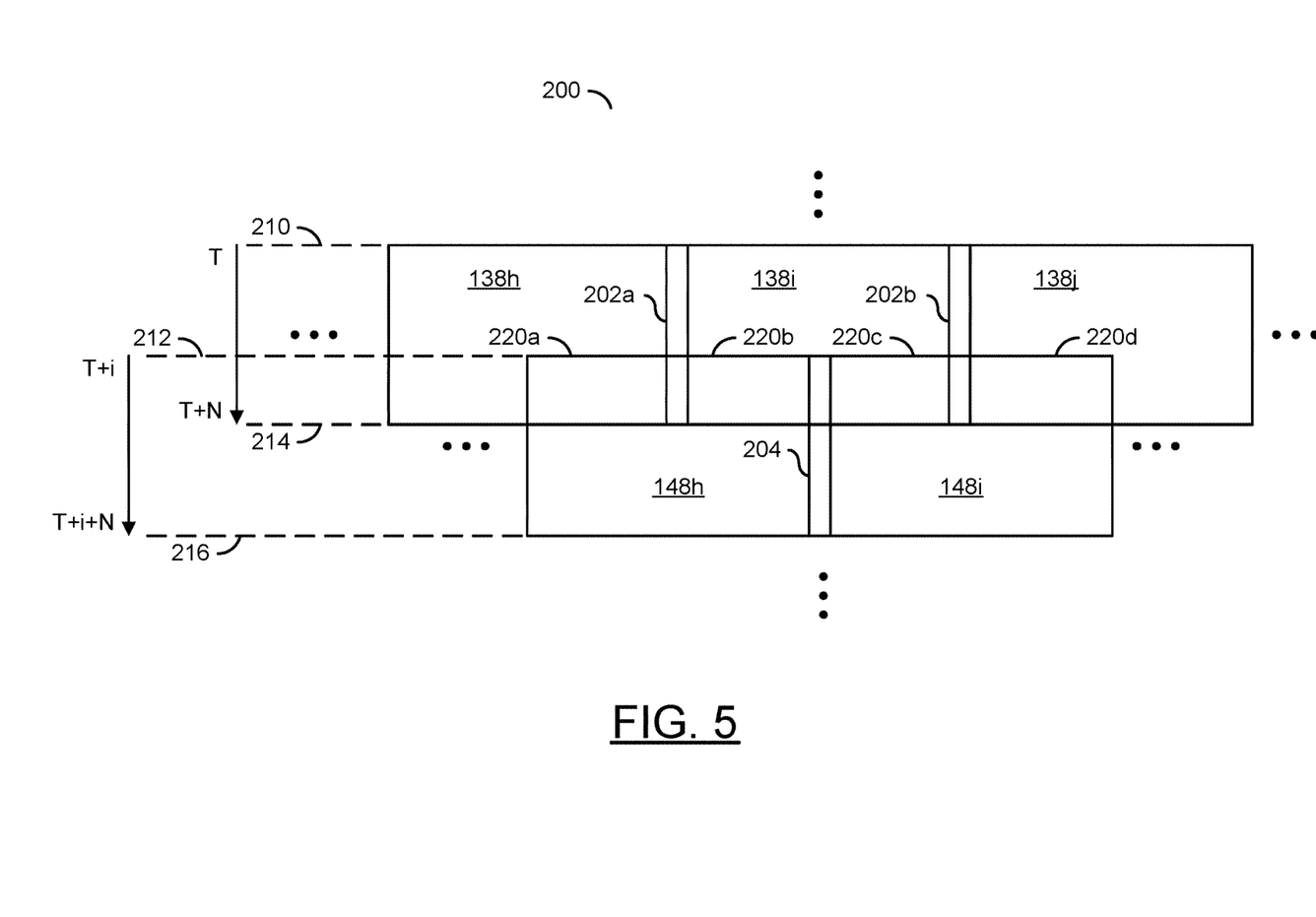
FIG. 5 is a diagram illustrating video stitching operation using rolling shutter camera sensors in a staggered arrangement.

Referring to FIG. 5, a diagram illustrating video stitching operation using rolling shutter camera sensors 132a-132n and/or 142a-142n in a staggered arrangement is shown. A frame 200 is shown. The frame 200 may represent a portion of the spherical video frame captured by the camera 50'. The frame 200 may comprise images 138a-138n and/or 148a-148n captured using the staggered arrangement of the lenses 110a-110n and/or 120a-120n of the camera 50'.

The frame 200 is shown generated from an image 138h, an image 138i and an image 138j captured using the lenses 110h-110j. The images 138h-138j may correspond to the rolling shutter sensors 132h-132j. The frame 200 is further shown generated from an image 148h and an image 148i captured using the lenses 120h-120i. The images 148h-148i may correspond to the rolling shutter sensors 142h-142i. The images 138h-138j and the images 148h-148i are shown in an overlapping arrangement. The overlapping arrangement of the images 138h-138j and the images 148h-148i may be a result of the staggered arrangement of the lenses 110a-110n and the lenses 120a-120n of the camera 50' (e.g., shown in connection with FIG. 2). The frame 200 may further comprise additional images stitched horizontally and/or vertically with respect to the images 138h-138j and/or the images 148h-148i.

Horizontal stitching boundaries 202a-202b are shown between the images 138h-138j. A horizontal boundary 204 is shown between the images 148*h*-148*i*. Overlapping boundaries 220*a*-220*d* are shown between the images 138*h*-138*j* and the images 148*h*-148*i*. For example, the overlapping boundary 220*a* may be the overlapping boundary between the image 138*h* and the image 148*h*. In another example, the overlapping boundary 220*b* may be the overlapping boundary between the image 138*i* and the image 148*h*. The processor 100 may be configured to implement the video stitching operations to stitch together the images 138*h*-138*j* and/or the images 142*h*-148*i* at the horizontal stitching boundaries 202*a*-202*b*, the horizontal boundary 204 and/or the overlapping boundaries 220*a*-220*d*.

The processor 100 and/or the camera sensors 132*a*-132*n* and/or 142*a*-142*n* may be configured to delay an exposure of one or more of the sensors 132*a*-132*n* and/or 142*a*-142*n* to prevent visual mismatches when stitching together the images 138*a*-138*n* and/or 148*a*-148*n*. A line 210 is shown. The line 210 may represent the top lines of the images 138*a*-138*n* captured by the rolling shutter sensors 132*a*-132*n*. An exposure for the pixels at the line 210 may be initiated at the time T. Subsequent lines of pixels of the rolling shutter sensors 132*a*-132*n* may begin being exposed in a downward direction at time passes. A line 212 is shown. The line 212 may represent a portion of the images 138*a*-138*n* where the overlap between the images 148*a*-148*n* begins. The pixels of the camera sensors 132*a*-132*n* at the line 212 may begin being exposed at the time T+i. The processor 100 may delay the exposure of the top lines of the sensors 142*a*-142*n* by an amount of time i. The pixels at the line 212 of the images 148*a*-148*n* (e.g., the top lines of the sensors 142*a*-142*n*) may begin being exposed at the time T+i. The pixels for the images 138*a*-138*n* may continue being exposed after the second row of the sensors 142*a*-142*n* has initiated an exposure of the images 148*a*-148*n*. The last line of the images 138*a*-138*n* may be exposed at the time T+N. The line 216 is shown. The line 216 may represent the last lines of the images 148*a*-148*n*. The last lines of the images 148*a*-148*n* may be exposed at the time T+i+N.

Figure 6:
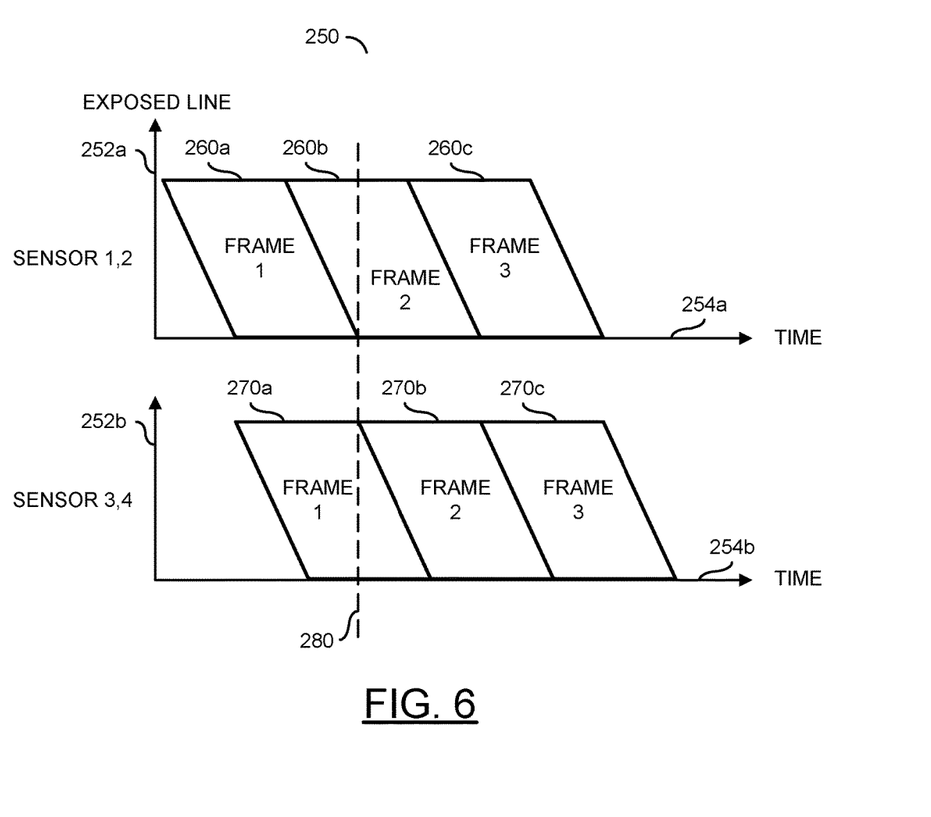
FIG. 6 is a diagram illustrating delaying a capture of video frames.

Referring to FIG. 6, a diagram 250 illustrating delaying a capture of video frames is shown. An axis 252*a* is shown. The axis 252*a* may represent a line position of an exposure of the sensors 132*a*-132*b*. An axis 252*b* is shown. The axis 252*b* may represent a line position of an exposure of the sensors 142*a*-142*b*. Axes 254*a*-254*b* are shown. The axes 254*a*-254*b* may represent a passage of time. Frames 260*a*-260*c* are shown. The frames 260*a*-260*c* may be a sequence of video frames captured by the sensors 132*a*-132*b* over time. Frames 270*a*-270*c* are shown. The frames 270*a*-270*c* may be a sequence of video frames captured by the sensors 142*a*-142*b* over time. Since different lines for the sensors 132*a*-132*b* and/or the sensors 142*a*-142*b* may start an exposure at different times, the frames 260*a*-260*c* and/or the frames 270*a*-270*c* may have a slanted shape.

A line 280 is shown. The line 280 shows a bottom of the frame 260*a* captured using one of the lenses 110*a*-110*n* from the first row of lenses lining up with a top of the frame 270*a* captured using one of the lenses 120*a*-120*n* from the second row of lenses. The delay i implemented by the processor 100 may be implemented to enable the frames 260*a*-260*c* to align with the frames 270*a*-270*c* without a mismatch. Since the lower sensors 142*a*-142*n* start exposure when the lower lines of the upper sensors 142*a*-142*n* start exposure, the frames 260*a*-260*c* may align with the frames 270*a*-270*c* when the video stitching operations are performed by the processor 100.

Figure 7:
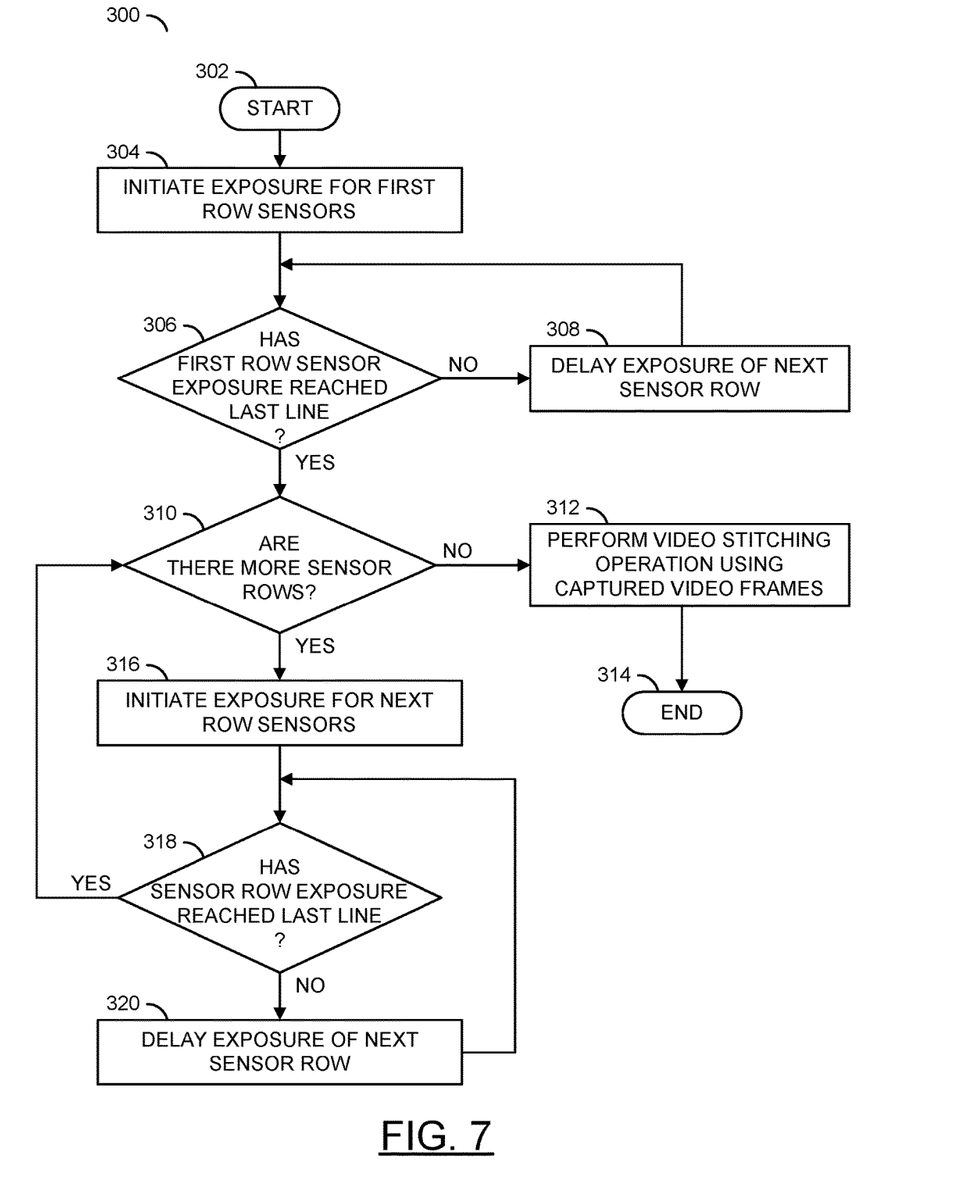
FIG. 7 is a flow diagram illustrating a method for delaying an exposure of capture devices to compensate for a rolling shutter effect.

Referring to FIG. 7, a method (or process) 300 is shown. The method 300 may delay an exposure of capture devices to compensate for a rolling shutter effect. The method 300 generally comprises a step (or state) 302, a step (or state) 304, a decision step (or state) 306, a step (or state) 308, a decision step (or state) 310, a step (or state) 312, a step (or state) 314, a step (or state) 316, a decision step (or state) 318, and a step (or state) 320.

The state 302 may start the method 300. In the state 304, the processor 100 may initiate an exposure for the rolling shutter sensors 132*a*-132*n* in the first row of lenses 110*a*-110*n*. Next, the method 300 may move to the decision state 306. In the decision state 306, the processor 100 may determine whether an exposure of the first row of sensors 132*a*-132*n* has reached a last line (e.g., whether the amount of delay i has passed).

If the exposure of the first row of sensors 132*a*-132*n* has not reached a last line, the method 300 may move to the state 308. In the state 308, the processor 100 may delay an exposure of the next row of sensors 142*a*-142*n* in the next row of lenses 120*a*-120*n*. The processor 100 may delay an exposure by not sending a signal to initiate an exposure (or switching off a signal preventing the initiation of the exposure). Next, the method 300 may return to the decision state 306. In the decision state 306, if the exposure of the first row of sensors 132*a*-132*n* has reached the last line, the method 300 may move to the decision state 310.

In the decision state 310, the processor 100 may determine whether there are more rows of sensors (e.g., the sensors 142*a*-142*n* and/or any additional rows of sensors). If there are not more rows of sensors, the method 300 may move to the state 312. In the state 312, the processor 100 may perform the video stitching operations using the captured video frames. Next, the method 300 may move to the state 314, which may end the method 314. In the decision state 310, if there are more rows of sensors, the method 300 may move to the state 316.

In the state 316, the processor 100 may initiate an exposure for the next row of sensors (e.g., the rolling shutter sensors 142*a*-142*n* and/or any subsequent rows). Next, the method 300 may move to the decision state 318. In the decision state 318, the processor 100 may determine whether the exposure for the sensors (e.g., 142*a*-142*n* and/or any additional sensor rows) has reached a last line (e.g., a predetermined portion). If the exposure of the sensors has reached the last line, the method 300 may return to the decision state 310. If the exposure of the sensors has not reached the last line the method 300 may move to the state 320. In the state 320, the processor 100 may delay an exposure for the sensors of a next row (e.g., any additional rows of sensors). The processor 100 may delay an exposure by not sending a signal to initiate an exposure (or switching off a signal preventing the initiation of the exposure). Next, the method 300 may return to the decision state 318.

Figure 8:
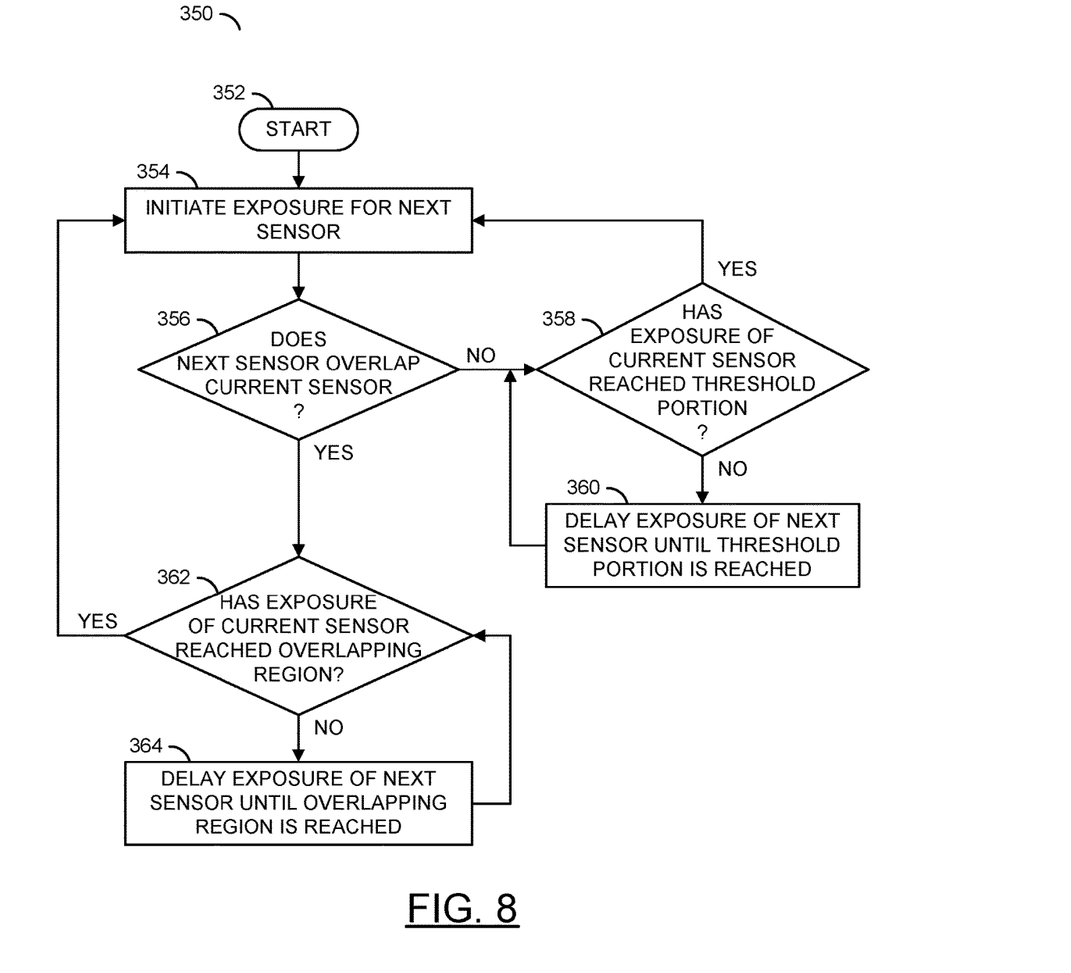
FIG. 8 is a flow diagram illustrating a method for compensating for a rolling shutter effect in a staggered arrangement.

Referring to FIG. 8, a method (or process) 350 is shown. The method 350 may compensate for a rolling shutter effect in a staggered arrangement. The method 350 generally comprises a step (or state) 352, a step (or state) 354, a decision step (or state) 356, a decision step (or state) 358, a step (or state) 360, a decision step (or state) 362, and a step (or state) 364.

The state 352 may start the method 350. In the state 354, the processor 100 may initiate an exposure for the next sensor (e.g., one or more of the sensors 132*a*-132*n*, 142*a*-142*n* and/or any additional rolling shutter sensors). Next, the method 350 may move to the decision state 356. In the decision state 356, the processor 100 may determine whether the next sensor overlaps the current sensor (e.g., the sensor currently being exposed). If the next sensor does not overlap the current sensor, the method 350 may move to the decision state 358. In the decision state 358, the processor 100 may determine whether an exposure of the current sensor (e.g., one of the sensors 132a-132n, 142a-142n and/or any additional rolling shutter sensors) has reached a threshold portion (e.g., determine whether the delay time i has passed).

If the exposure of the current sensor has not reached the threshold portion, the method 350 may move to the state 360. In the state 360, the processor 100 may delay an exposure of the next sensor (e.g., the rolling shutter sensors 142a-142n and/or any additional rolling shutter sensors) until the threshold portion has been reached. The processor 100 may delay an exposure by not sending a signal to initiate an exposure (or switching off a signal preventing the initiation of the exposure). Next, the method 350 may return to the decision state 358. In the decision state 358, if the exposure of the current sensor has reached the threshold portion, the method 350 may return to the state 354.

In the decision state 356, if the next sensor (e.g., one or more of the sensors 142a-142n and/or any additional sensors) does overlap the current sensor, the method 350 may move to the decision state 362. In the decision state 362, the processor 100 may determine whether an exposure of the current sensor (e.g., one or more of the rolling shutter sensors 132a-132n, 142a-142n and/or additional rolling shutter sensors) has reached an overlapping region. If the exposure of the current sensor has not reached the overlapping region, the method 350 may move to the state 364. In the state 364, the processor 100 may delay an exposure of the next sensor (e.g., one or more of the rolling shutter sensors 142a-142n and/or any additional rolling shutter sensors) until the overlapping region has been reached. Next, the method 350 may return to the decision state 362. In the decision state 362, if the exposure of the current sensor has reached the overlapping region, the method 350 may return to the state 354.

Figure 9:
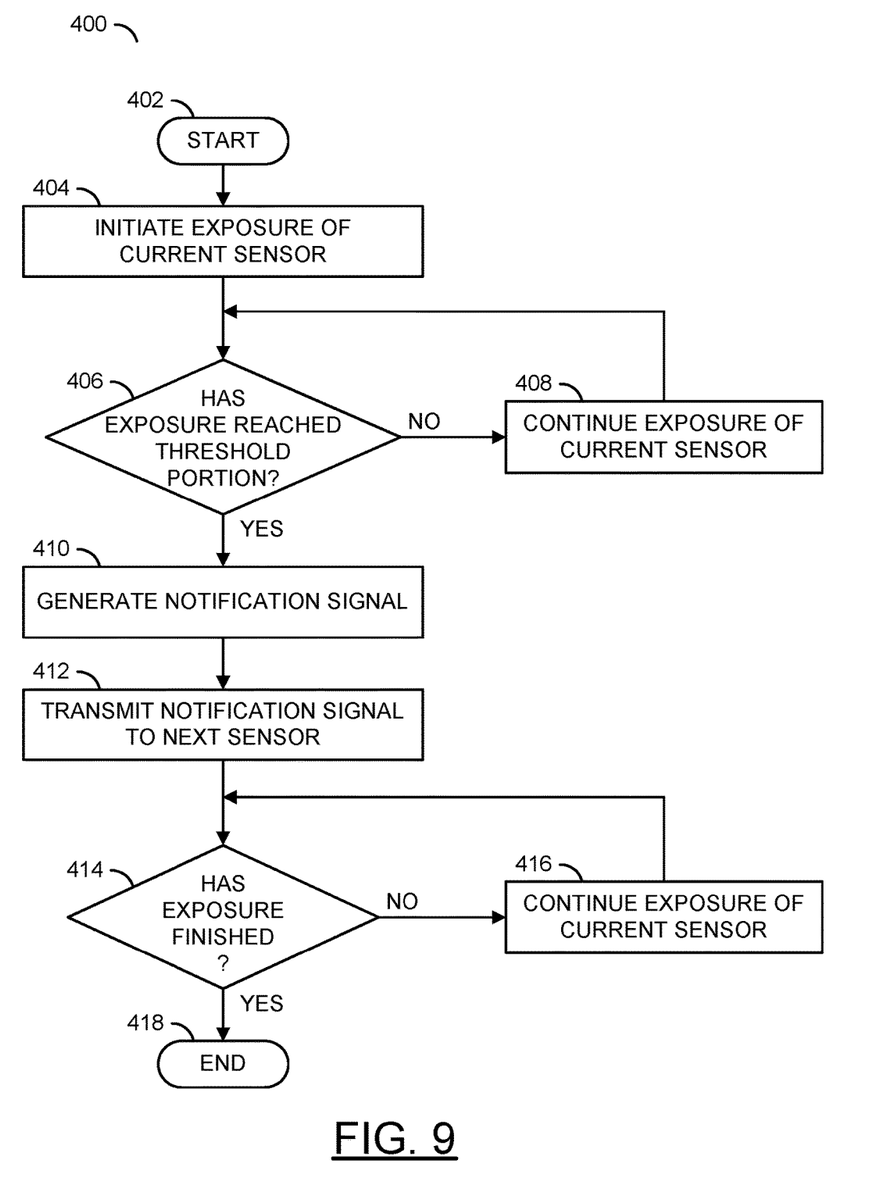
FIG. 9 is a flow diagram illustrating a method for generating notification signals from the sensors.

Referring to FIG. 9, a method (or process) 400 is shown. The method 400 may generate notification signals from the sensors. The method 400 generally comprises a step (or state) 402, a step (or state) 404, a decision step (or state) 406, a step (or state) 408, a step (or state) 410, a step (or state) 412, a decision step (or state) 414, a step (or state) 416, and a step (or state) 418.

The state 402 may start the method 400. In the state 404, the processor 100 may initiate an exposure for a current sensor (e.g., one of the sensors 132a-132n). Next, the method 400 may move to the decision state 406. In the decision state 406, the current sensor (or, in some embodiments, the processor 100) may determine whether the exposure of the current sensor has reached a threshold portion (e.g., the portion that corresponds to the delay time i). If the exposure of the current sensor (e.g., one or more of the sensors 132a-132n) has not reached the threshold portion, the method 400 may move to the state 408. In the state 408, the current sensor may continue the exposure (e.g., expose subsequent pixel rows). Next, the method 400 may return to the decision state 406.

In the decision state 406, if the exposure of the current sensor has reached the threshold portion, the method 400 may move to the state 410. In the state 410, the current sensor (e.g., one or more of the rolling shutter sensors 132a-132n) may generate the notification signal (e.g., the signals INIT_A-INIT_N). Next, in the state 412, the current rolling shutter sensors may transmit the notification signals INIT_A-INIT_N to the next sensor (e.g., one or more of the rolling shutter sensors 142a-142n). For example, the rolling shutter sensors 142a-142n may initiate an exposure in response to receiving the signals INIT_A-INIT_N. Next, the method 400 may move to the decision state 414.

In the decision state 414, the current sensor (and/or, in some embodiments, the processor 100) may determine whether the current sensor (e.g., one or more of the rolling shutter sensors 132a-132n) has finished the exposure (e.g., the last line of the pixel array has been exposed). If the current sensor has not finished the exposure, the method 400 may move to the state 416. In the state 416, the exposure of the current sensor (e.g., one or more of the rolling shutter sensors 132a-132n) may continue (e.g., the exposure may continue to subsequent lines of the pixel array). Next, the method 400 may return to the decision state 414. In the decision state 414, if the current sensor has finished the exposure, the method 400 may move to the state 418. The state 418 may end the method 400.

The functions and structures illustrated in the diagrams of FIGS. 1 to 9 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:
1. A method for compensating for rolling shutter sensors in a multi-sensor camera comprising the steps of:
  initiating an exposure of one or more first image sensors (i) arranged in an upper row and (ii) configured to expose a first plurality of lines;

delaying an exposure of one or more second image sensors (i) arranged in a lower row and (ii) configured to expose a second plurality of lines, wherein said delay allows a portion of said first image sensors to reach an overlapping line between said first image sensors and said second image sensors; and performing a video stitching operation based on video frames captured by said first image sensors and said second image sensors to generate a stitched video signal, wherein said overlapping line between said first image sensors and said second image sensors avoids a skew of an object captured that overlaps said first image sensors and said second image sensors.

2. The method according to claim 1, wherein said portion is determined based on a vertical field of view covered by said first image sensors and said second image sensors.

3. The method according to claim 2, wherein said vertical field of view covered by at least one of said first image sensors and at least one of said second image sensors covers said overlapping region.

4. The method according to claim 3, wherein said exposure of said second image sensors is started when said exposure of said first image sensors reaches said overlapping region.

5. The method according to claim 2, wherein said first image sensors and said second image sensors are implemented in a staggered arrangement.

6. The method according to claim 1, wherein said exposure of said second image sensors is started when said exposure of said first image sensors reaches a last of said plurality of lines.

7. The method according to claim 1, wherein said stitched video signal is a spherical video.

8. The method according to claim 1, wherein said first image sensors and said second sensors each comprise a wide angle lens.

9. The method according to claim 1, wherein said first image sensors and said second image sensors each implement rolling shutter sensors.

10. The method according to claim 9, wherein a top portion of said first image sensors and said second image sensors are exposed earlier than a lower portion of said first image sensors and said second image sensors.

11. The method according to claim 1, wherein delaying said second image sensors aligns said exposure of a bottom portion of said first image sensors to said exposure of a top portion of said second image sensors for said video stitching operation.

12. An apparatus comprising:
one or more first image sensors arranged in an upper row;
one or more second image sensors arranged in a lower row; and
a processor configured to (a) initiate an exposure of a plurality of lines in said first image sensors, (b) delay an exposure of a plurality of lines said second image sensors until an overlapping line between said first image sensors and said second image sensors is started and (c) perform video stitching operations on video frames captured by said first image sensors and said second image sensors to generate a stitched video signal, wherein said overlapping line avoids a skew of an object captured that overlaps said first image sensors and said second image sensors.

13. An apparatus comprising:
one or more first image sensors arranged in an upper row configured to (i) initiate a first exposure of a first plurality of lines and (ii) generate a notification signal when a portion of said first exposure is started; and
one or more second image sensors arranged in a lower row configured to initiate a second exposure of a second plurality of lines in response to said notification signal, wherein (A) video frames captured by said first image sensors and said second image sensors are transmitted to a processor to generate a stitched video signal and (B) an overlapping line between said first image sensors and said second image sensors avoids a skew of an object captured that overlaps said first image sensors and said second image sensors.

14. The apparatus according to claim 12, wherein said delay is calibrated based on a specification of a rolling shutter of said first sensors and said second sensors.

15. The apparatus according to claim 12, wherein said delay is calibrated based on a user input.

16. The apparatus according to claim 13, wherein said notification signal is calibrated based on a specification of a rolling shutter of said first sensors and said second sensors.

17. The apparatus according to claim 13, wherein said notification signal is calibrated based on a user input.

18. The method according to claim 1, wherein said delay is calibrated based on a specification of a rolling shutter of said first sensors and said second sensors.

19. The method according to claim 1, wherein said delay is calibrated based on a user input.

* * * * *